(No Model.) 2 Sheets—Sheet 1.
F. X. HOOPER.
APPARATUS FOR DRYING PRINTED OR VARNISHED PAPER.
No. 512,377. Patented Jan. 9, 1894.
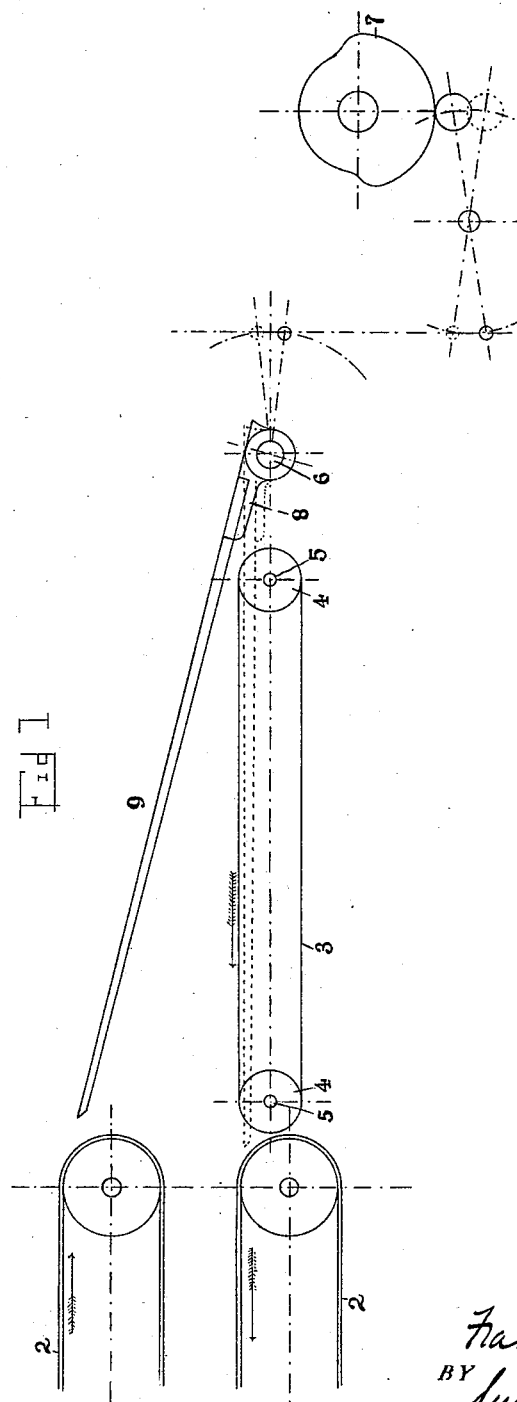
WITNESSES:
Dan'l Fisher
Thomas Conroy.
INVENTOR.
Francis X Hooper
BY
ATTORNEYS

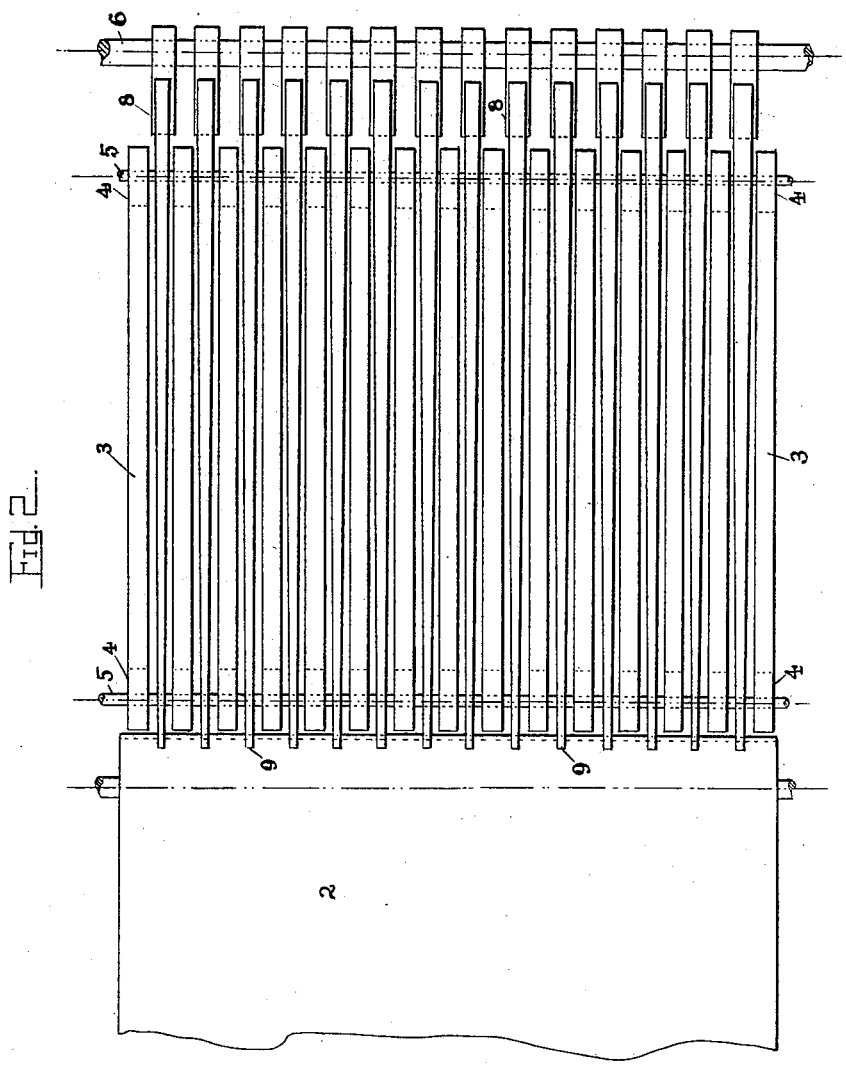

UNITED STATES PATENT OFFICE.

FRANCIS X. HOOPER, OF BALTIMORE, MARYLAND.

APPARATUS FOR DRYING PRINTED OR VARNISHED PAPER.

SPECIFICATION forming part of Letters Patent No. 512,377, dated January 9, 1894.

Application filed March 17, 1893. Serial No. 466,457. (No model.)

*To all whom it may concern:*

Be it known that I, FRANCIS X. HOOPER, of the city of Baltimore and State of Maryland, have invented certain Improvements in Apparatus for Drying Newly-Printed, Varnished, or Otherwise-Treated Sheets of Paper, of which the following is a specification.

This invention relates to a drying apparatus adapted to be used more particularly in connection with machines for coating paper.

One object of the invention is to provide a simple and effective mechanism by which the paper to be dried may be removed from one conveyer belt and transported to another conveyer belt without exposing the coated surface of the paper to contact with any obstruction, or without turning or folding the paper.

A further object is to provide a series of transporting tapes and a flier frame, the said tapes being operated independently of the flier frame, and coacting therewith when the frame has brought the paper to the position to be conveyed to one of the conveyer belts.

With these objects in view the invention consists in the novel construction and combination of parts of a drying apparatus, as will be hereinafter fully described and pointed out in the claim.

In the accompanying drawings forming a part of this specification, and in which like numerals of reference indicate corresponding parts: Figure 1, is a side elevation, a portion being diagrammatic, showing the upper and lower conveyer belts, the transporting tapes, and the flier frame elevated to the position to receive the paper from the upper conveyer belt. Fig. 2, is a plan view of the bottom conveyer belt, the transporting tapes, and the flier-frame in its lowered position.

Referring to the drawings, 1 and 2, designate respectively the upper and lower conveyer belts, which, as indicated by the arrows, move in opposite directions. As the mechanism for imparting a motion to the belts may be of any of the approved or well known construction an illustration of it is deemed unnecessary, Arranged in alignment with the lower conveyer belt 2 are the transporting tapes 3 each of which passes around two independent pulleys 4 which are mounted upon shafts 5, driven by mechanism not shown. The forward shaft of the transporting tape pulleys is journaled sufficiently near the pulley of the lower conveyer belt to allow but a small space between the two so that there will be no danger of the paper becoming folded or buckled as it passes from the transporting tapes to the conveyer belt.

Suitably journaled at a point in rear of the transporting tapes is a shaft 6, which is adapted to be vibrated from a cam 7 through intermediate mechanism indicated diagrammatically by dotted lines. As the operation of this portion of the mechanism is obvious, it is not thought necessary to illustrate it fully. Upon shaft 6 is mounted a series of arms 8, each of which carries a flier stick 9 which is adapted to work between the transporting tapes, as clearly shown in Fig. 2. When the flier sticks are in their elevated position, their free ends are in alignment with the upper surface of the conveyer belt, and when in their lowered position, are slightly below the upper surface of the transporting tapes, as clearly shown in Fig. 1. By this arrangement, the paper is automatically removed from the flier sticks as soon as it contacts with the transporting tapes, and the latter conveys it to the lower conveyer belt in a manner that will be perfectly obvious.

Having thus fully described my invention, what I claim as new, and desire to secure by Letters Patent, is—

In an apparatus for drying paper, the combination of an upper and a lower conveyer belt, a series of transporting tapes co-acting with the lower conveyer belt, and a series of flier sticks adapted to support the paper from the upper conveyer belt to the transporting tapes, the said sticks in their raised position being at an angle to the upper conveyer belt, and in their lowered position parallel with and slightly below the upper surface of the transporting tapes and in horizontal alignment with the lower conveyor belt.

FRANCIS X. HOOPER.

Witnesses:
GEO. E. TAYLOR,
WM. T. HOWARD.